Figure 1:
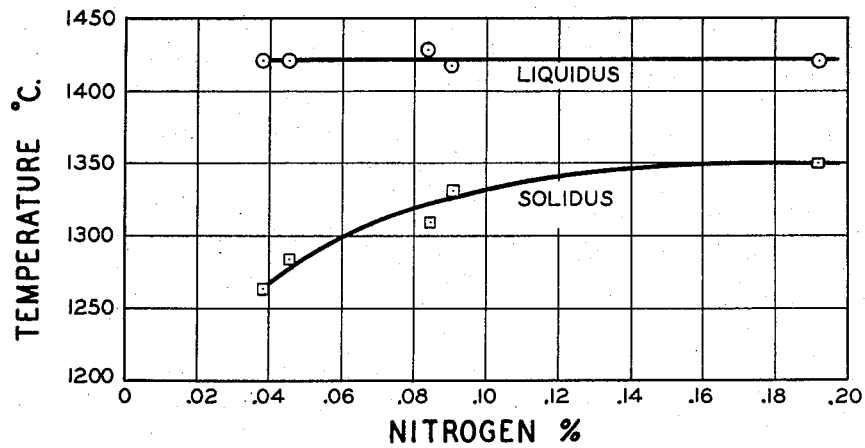

INVENTORS
ROGER A. PERKINS
WILLIAM O. BINDER
BY John F. Hohmann
ATTORNEY

2,871,118

RESISTANCE TO HOT-CRACKING OF CHROMIUM-NICKEL STEEL WELDS

Roger A. Perkins, Tonawanda, and William O. Binder, Lewiston, N. Y., assignors to Union Carbide Corporation, a corporation of New York Application September 11, 1956, Serial No. 609,159

8 Claims. (Cl. 75—130.5)

This invention relates to improvements in the welding characteristics of austenitic chromium-nickel steels. It is concerned more particularly with a method for improving the resistance to hot-cracking of restrained weld deposits in type 347 steels.

Successful fabrication of high temperature austenitic steel alloys requires sound welds having a fully austenitic structure with mechanical and corrosion behavior approaching that of the base metal. Under conditions of restraint particularly, weld deposits are subject to hot cracking. This objectionable condition may assume several forms. Most commonly it includes defects denominated as crater cracks, root cracks, notch extension cracks and combined base and weld metal cracks.

The most common type of weld hot cracking occurs when stress is applied during solidification of the metal. In the prior art various empirical procedures have been suggested and tried to reduce weld cracking, but none has been entirely acceptable for general applications. It has been shown that with certain steels, crack-sensitivity can be reduced markedly either by adjusting the composition to produce 5 percent to 10 percent ferrite in the weld structure, by raising the carbon content, or by removing silicon. All these expedients effect unwanted results. For one, the presence of ferrite in the weld structure appreciably alters the mechanical properties, and especially detracts from the high temperature properties of the steel. Raising the carbon content undesirably reduces the general level of corrosion resistance, increases susceptibility to intergranular attack, and further requires large columbium additions for stabilization. For its part, the removal of silicon to reduce weld cracking is not economically practical.

Hitherto nitrogen has been ignored for the most part as an additive capable of affecting the welding cracking tendency of the alloys of interest. Indeed as reported by D. I. Medouar in Automaticheskaya Svarka, volume 6, 1953, No. 4, pp. 10–18, and also by R. K. Lee in Metals Progress, volume 51, 1947, pp. 445–447, the former technical knowledge concerning the action of nitrogen on weld cracking was to the effect that nitrogen promoted weld cracking. Unpredictably, it now has been found that nitrogen is effective in reducing weld cracking.

It is the primary object of the invention, accordingly, to provide austenitic chromium-nickel steel welds having greatly improved resistance to hot cracking, and capable of withstanding severe mechanical stress at high temperatures.

A further object is to provide welding rods as in the form of electrodes, composed of an austenitic alloy of iron, nickel, chromium, columbium and other alloy additions having mechanical and corrosive behavior approaching that of the base metal, owing to a critical residual nitrogen and carbon content.

A further object of the invention is to provide a method for improving the resistance to hot cracking of restrained weld deposits and austentic alloys of iron, chromium and nickel by providing a critical amount of nitrogen to such weld deposits.

Figure 2:
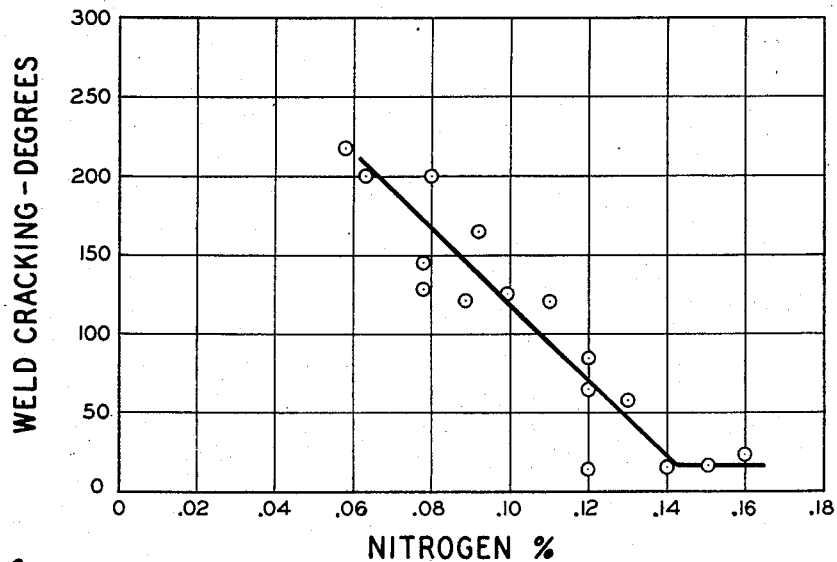

In the drawings:

Fig. 1 graphically illustrates the effect of nitrogen on solidification range; and Fig. 2 is a graph showing the effect of nitrogen on weld cracking.

Most austenitic alloys possess inherent susceptibility to weld hot cracking. These alloys have unfavorable conditions of solidification charatcerized by wide solidification ranges and low solidus temperatures. The present invention contemplates raising the nitrogen content of the alloys in question above their normal value following standard air melting practices up to about 0.25 percent in order to reduce the wide solidification range.

The manner in which nitrogen is provided to the weld deposits is not critical. It may be added either in the form of an alloy element in a welding rod, as a nitrogen-bearing electrode coating, or in the form of a nitrogen-bearing protective atmosphere. Nitrided pellets of ferro-chromium suitable for providing the required amount of nitrogen to filler rods are disclosed and claimed in the copending application of E. R. Saunders et al., Serial No. 383,708, filed October 1, 1953, now Patent No. 2,797,156.

Indications that solidification range is a major factor in controlling weld cracking are stated by Apblett and Pellini in page 835 and following of the Welding Journal for February 1954. The effect of nitrogen on solidification was studied in connection with the present invention. Using 8 pound melts of type 347 stainless steel, it was first ascertained that the end of solidification (solidus temperature) occurred at progressively higher temperatures with increasing nitrogen content, notably decreasing the range of solidification. Fig. 1 illustrates this relationship.

For the sake of conciseness, confirmatory evidence of the practicability of the method of the invention will be illustrated in detail by reference mainly to the performance of type 347 steel welds modified in nitrogen content according to our present invention.

As regards type 347 steels, the improvement in their resistance to weld cracking in accordance with the present invention results from the addition of nitrogen in an amount related to the carbon content as follows:

Carbon_____ Less than 0.10 percent
Nitrogen_____ 0.05 percent to 0.25 percent
Carbon plus nitrogen_____ Greater than 0.15 percent
Nitrogen_____ Equal to or greater than carbon With type 347 steel, optimum results were obtained with 0.03 percent to 0.05 percent carbon, and 0.18 percent to 0.12 percent nitrogen.

In practice, type 347 steel was air melted in a basic lined, high frequency induction furnace using iron, low carbon ferrochromium, high carbon ferrochromium, nitrogen ferrochromium, electrolytic nickel, ferrocolumbium, silicon and manganese as raw materials. Twelve pound heats were poured into a 2 inches x 2 inches cast iron ingot mold at 1550° C. to 1675° C. The lower portion of the ingot was forged to a ⅞ inch square bar, and groove-rolled to a ¼ inch diameter rod. The center portion was rolled to a ⅝ inch thick plate for welding tests. Hot working was carried out at 1100° C. to 1125° C. The ¼ inch rod was ground and cold-swaged to a 9/16 inch diameter welding rod. The ⅝ inch plate was cut to a 5 inches x 5 inches square blank. A circular groove 2 inches in diameter with an included angle of 90° was machined to a depth of ½ inch in the test plates. Resistance to weld cracking was evaluated by depositing filler metal of the same composition as the base plate by using inert gas shielded arc welding. Circular welds were deposited at a speed of 1 R. P. M., using a current of 240 amperes (direct current, straight polarity) and an argon flow rate of 20 C. F. H. The total arc subtended by cracks or fissures was taken as the measure of crack resistance. All welds were examined metallographically for soundness and structure. A magnetic balance was used to test for ferrite content. Welds made in this example and exhibiting reduced cracking had the following composition range:

| | |
|---|---|
| Cr | 17–20 percent |
| Ni | 10.5–12.5 percent |
| Si | 1.5 percent maximum |
| Mn | 2.0 percent maximum |
| Cb | 0.7–2.0 percent |
| C | 0.01–0.09 percent |
| N | 0.10–0.25 percent |
| Fe and miscellaneous impurities | Balance |

As conducive to a clearer understanding of certain features of this invention, it may be noted at this point that the welding rod and the base metal should be of a similar alloy. However, their compositions need not be identical, particularly with respect to nitrogen.

The above tests were made using plates and rod of the same composition to simplify interpretation of the data. Although the analytical data cited were obtained by chemical analysis of welding rods and plates, they can be interpreted to be weld composition, as no appreciable change in composition occurs with welding under these conditions. When base metal and welding rods have a different composition, dilution factors must be considered, and a rod must be selected that will produce the correct carbon and nitrogen in the weld.

To illustrate the successful practice of the invention, commercial type 347 stainless steel plates were welded with nitrogen-bearing welding rods, and tests were made to determine crack sensitivity, mechanical properties and corrosion behavior. The composition of the steels used is given in the following table.

| Material | Composition, percent | | | | | | |
|---|---|---|---|---|---|---|---|
| | C | Si | Mn | Cr | Ni | Cb | N |
| Commercial plate | 0.063 | 0.38 | 1.57 | 18.42 | 11.61 | 0.74 | 0.05/0.06 |
| Experimental weld rod | 0.050 | 0.55 | 1.8 | 18.74 | 11.03 | 0.9 | 0.12 |

Two plates, 3 x 12 x ½ inches, previously annealed for 15 minutes at 1075° C. and beveled to form a 60° included angle were butt-welded by means of inert gas shielded arc welding. Three-pass welds were used to fill the weld, and one pass was made on the reverse side to ensure complete fusion. No weld cracking occurred, even though the plates were tightly clamped to duplicate conditions of restraint during welding. Samples were cut both from the weld and transverse to the weld. These were tested for mechanical and corrosion behaviour in the as-welded and in the stress-relieved conditions. The stress-relieving treatment consisted of heating for two hours at 870° C., and then cooling at the rate of 50° C. per hour down to 590° C., followed by a furnace cool to room temperature.

The tensile properties of the above weld deposit were comparable, and in some respects, superior to those of the plate metal as shown in the following table.

As indicated in the above table, the high nitrogen weld deposits have a greater yield strength and equivalent ductility when compared with the plate. Stress-relieving resulted in slight increases in tensile and yield strengths with but a slight drop in ductility.

The notch toughness of the weld deposits were determined by Charpy key hole impact tests on transverse specimens notched in the weld. No significant drop in toughness resulted from the stress-relieving treatment, as is indicated below.

| Material | Condition | Charpy keyhole impact, ft. lb. | |
|---|---|---|---|
| | | 25° C. | −183° C. |
| Experimental weld deposit | As-welded | 31 | 16 |
| | Stress-relieved | 27 | 14 |

In order to check the effects of nitrogen on resistance to general corrosion and intergranular attack, samples of the weld test plates were annealed, sensitized and treated in a 3 percent HF-10 percent HNO₃ solution at 70° C. Composite weld plate specimens cut transverse to the weld were tested by boiling in this solution, as well as by boiling in 65 percent nitric acid. As indicated in the following table, the welds exhibited satisfactory corrosion resistance, and corrosion appeared uniform over plate and weld areas. Resistance to boiling 65 percent nitric acid was decreased slightly by the stress-relieving treatment, but the attack was uniform, and no intergranular susceptibility was indicated.

| Material | Condition | Inch penetration/month | |
|---|---|---|---|
| | | 65% HNO₃ | 3% HF-10% HNO₃ |
| Experimental plate and weld deposit. | As-welded | 0.00084 | 0.294 |
| | Stress-relieved | 0.00147 | 0.249 |

It is possible to obtain similar improvements in resistance to hot cracking with other alloy compositions such as type 310 columbium, type 316 columbium, type 304, type 304-L and 330 stainless steel by raising their nitrogen content to above the amount normally present in them after usual air melting practices to bring the nitrogen content to about 0.1 to 0.25 percent, or up to the solubility limit of nitrogen in such steels. It is not possible, however, to give more definite numerical indication of the amount of nitrogen required for all austenitic alloys prone to hot cracking, since this depends upon their base compositions and other conditions.

There are a number of advantages to be gained by the practice of this invention. It is desirable in welding austenitic chromium-nickel steels for high temperature applications to obtan an essentially austenitic weld structure. The conventional method of adjusting composition to promote ferrite formation in the weld deposit to prevent weld cracking does not fulfill this requirement. When nitrogen is used to ensure resistance to weld cracking, the resulting welds are essentially austenitic. The nitrogen refines the cast structure, and increases the yield strength of the weld. Nitrogen does not detract from corrosion resistance, whereas carbon does. In addition, nitrogen exerts a greater stabilizing

| Material | Condition | Ultimate tensile strength, p. s. i. | Yield strength at 0.2% offset, p. s. i. | Elongation in 1 in., percent | Red. of area, percent |
|---|---|---|---|---|---|
| Commercial plate | Annealed | 87,000/88,000 | 38,000/39,000 | 55/55 | |
| Experimental weld deposit | As-welded | 85,300 | 50,000 | 54.0 | 50.4 |
| | Stress-relieved | 88,700 | 52,250 | 36.0 | 40.4 | influence on the austenite, particularly in the presence of silicon. Furthermore, high silicon contents can be tolerated in nitrogen-bearing welds, and no special techniques are required to produce welding rods for these applications. In the case of columbium-containing compositions, the inclusion of nitrogen in the weld deposit is also advantageous, in that with a low carbon content, a minimum of columbium is required in the alloy. As an excess of columbium is known to produce crater cracks in welds, this last feature represents a marked advantage of the present invention.

In addition to the foregoing advantages, the welds produced with high nitrogen content in accordance with the invention do not lose ductility as do many commercial welds.

The following table sets forth the alloying constituent chemical compositions for the standard A. I. S. I. stainless steel types referred to hereinabove:

| A. I. S. I. type No. | Chemical composition, percent | | | | | | | |
|---|---|---|---|---|---|---|---|---|
| | C max. | Mn max. | Si max. | P max. | S max. | Cr | Ni | Other |
| 304 | 0.08 | 2.0 | 1.0 | 0.04 | 0.03 | 18–20 | 8–11 | |
| 310 | 0.25 | 2.0 | 1.5 | 0.04 | 0.03 | 24–26 | 19–22 | |
| 316 | 0.10 | 2.0 | 1.0 | 0.04 | 0.03 | 16–18 | 10–14 | 2–3 Mo. |
| 330 | 0.25 | | | | | 14–16 | 33–36 | |
| 347 | 0.08 | 2.0 | 1.0 | 0.04 | 0.03 | 17–19 | 9–12 | Cb=10XC min. |

The suffix "L" employed after a type number designates low carbon content, i. e., 0.03 max. in the case of type 304–L stainless steel.

What is claimed is:

1. In a method for improving the resistance to hot-cracking of restrained weld deposits of austenitic alloys of iron, chromium and nickel, the step which consists in increasing the nitrogen content of said alloys from above the normal value present therein following standard air melting practices up to a value between about 0.1 and 0.25 percent.

2. In a method for improving the resistance to hot-cracking of restrained weld deposits in autenitic alloys of iron, chromium and nickel, the improvement which consists in providing nitrogen to said weld deposits in a proportion of up to about 0.25 percent by the thermal fusion of a welding rod having substantially the composition 17 percent to 20 percent chromium; 10.5 percent to 12.5 percent nickel; up to 2.0 percent manganese; up to 1.5 percent silicon; up to 2.0 percent columbium; 0.01 percent to 0.09 percent carbon; 0.1 percent to about 0.25 percent nitrogen; balance substantially all iron.

3. In a method for improving the resistance to hot cracking of restrained weld deposits of a steel consisting essentially of 17 and 19 percent chromium, 9 to 12 percent nickel, up to 0.03 percent sulphur, up to 0.04 percent phosphorus, up to 1.0 percent silicon, up to 2.0 percent manganese, up to 0.08 percent carbon, columbium in an amount at least equal to ten times the carbon content and the balance iron, the improvement which comprises providing nitrogen to said weld deposits in an amount of about 0.10 percent to 0.25 percent, said nitrogen being related to the carbon content so that the combined carbon and nitrogen content equals a numerical value greater than 0.15 percent.

4. In a method for improving the resistance to hot cracking of restrained ferrous weld deposits of a steel consisting essentially of 24 to 26 percent chromium, 19 to 22 percent nickel, up to 0.03 percent sulphur, up to 0.04 percent phosphorus, up to 1.5 percent silicon, up to 2.0 percent manganese, up to 0.25 percent carbon and the balance iron, the improvement which consists in providing from 0.1 percent to 0.25 percent nitrogen to said weld deposits.

5. In a method for improving the resistance to hot cracking of restrained weld deposits of a steel consisting essentially of 16 to 18 percent chromium, 10 to 14 percent nickel, up to 0.03 percent sulphur, up to 0.04 percent phosphorus, up to 1.0 percent silicon, up to 2.0 percent manganese, up to 0.10 percent carbon, 2 to 3 percent molybdenum and the balance iron, the improvement which consists in providing about 0.10 to 0.25 percent nitrogen to said weld deposits.

6. In a method for improving the resistance to hot cracking of restrained weld deposits of a steel consisting essentially of 18 to 20 percent chromium, 8 to 11 percent nickel, up to 0.03 percent sulphur, up to 0.04 percent phosphorus, up to 1.0 percent silicon, up to 2.0 percent manganese, up to 0.08 percent carbon and the balance iron, the improvement which comprises providing about 0.1 to about 0.25 percent of nitrogen to said weld deposits.

7. In a method for improving the resistance to hot cracking of restrained weld deposits of a steel consisting essentially of 14 to 16 percent chromium, 33 to 36 percent nickel, up to 0.25 percent carbon and the balance iron, the step of providing from about 0.1 percent of nitrogen up to the solubility limit of nitrogen in said alloy.

8. In a method for improving the resistance to hot cracking of restrained weld deposits of a steel consisting essentially of 18 to 20 percent chromium, 8 to 11 percent nickel, up to 0.03 percent sulphur, up to 0.04 percent phosphorus, up to 1.0 percent silicon, up to 2.0 percent manganese, up to 0.03 percent carbon and the balance iron, the step of providing from about 0.1 to 0.25 percent of nitrogen to said welds.

References Cited in the file of this patent

UNITED STATES PATENTS

| 1,990,590 | Franks | Feb. 12, 1935 |
| 2,229,065 | Franks | Jan. 21, 1941 |
| 2,405,666 | Norwood | Aug. 13, 1946 |
| 2,789,048 | De Long et al. | Apr. 16, 1957 |

OTHER REFERENCES

"Nitrogen in Chromium Alloy Steels," 1941, page 17. Pamphlet published by the Electro Metallurgical Co., N. Y., N. Y.

Medouar: Automaticheskaya Svarka, vol. 6, No. 4, 1953, pages 10–18.

Hoerl et al.: U. S. AEC Report NYO–3500, October 29, 1956. Available from the Office of Technical Services, Dept. of Commerce, Wash. 25, D. C.